(12) United States Patent  (10) Patent No.: US 7,815,170 B2
Devine, Jr. et al.  (45) Date of Patent: Oct. 19, 2010

(54) VALVE ASSEMBLY HAVING A REINFORCED VALVE SEAT

(75) Inventors: Donald L. Devine, Jr., Reno, NV (US); John W. Muran, Reno, NV (US); David L. Gambetta, Reno, NV (US)

(73) Assignee: Tyco Valves & Controls LP, Houston, TX (US)

( * ) Notice: Subject to any disclaimer, the term of this patent is extended or adjusted under 35 U.S.C. 154(b) by 404 days.

(21) Appl. No.: 11/939,870

(22) Filed: Nov. 14, 2007

(65) Prior Publication Data

US 2009/0121173 A1  May 14, 2009

(51) Int. Cl.
  *F16K 3/00*  (2006.01)
(52) U.S. Cl. ....................... 251/328; 251/326
(58) Field of Classification Search ................ 251/326, 251/328, 329
  See application file for complete search history.

(56) References Cited

U.S. PATENT DOCUMENTS

| 4,201,365 | A |   | 5/1980  | Paptzun et al. |
| 4,206,905 | A | * | 6/1980  | Dobler .................. 251/328 |
| 4,688,597 | A |   | 8/1987  | Clarkson et al. |
| 4,881,719 | A | * | 11/1989 | Bowman .................. 251/328 |
| 5,271,426 | A |   | 12/1993 | Clarkson et al. |
| 5,653,423 | A |   | 8/1997  | Young et al. |
| 5,979,874 | A | * | 11/1999 | Gambetta et al. .......... 251/328 |
| 6,375,157 | B1 |  | 4/2002  | Van de Lande |
| 6,959,912 | B2 | * | 11/2005 | Reeves et al. ............ 251/214 |
| 7,059,586 | B2 |  | 6/2006  | Vanderberg et al. |
| 7,350,766 | B2 | * | 4/2008  | Comstock et al. .......... 251/328 |
| 2006/0255305 | A1 | | 11/2006 | Comstock et al. |

* cited by examiner

*Primary Examiner*—John K Fristoe, Jr.
(74) *Attorney, Agent, or Firm*—Daniel N. Daisak

(57) ABSTRACT

A knife gate valve includes a reinforced valve seat which prevents displacement of the valve seat when the valve is opened and closed. The valve includes a valve body defined by a first and second body halves. The valve halves are assembled to define a flow path, a knife gate channel and a seat channel. A knife gate is disposed between the body halves and is adapted to traverse the gate channel. The knife gate is configured to be in an open position to allow process flow through the valve and a closed position to prevent process flow through the valve. A seat assembly is positioned within the channel guide and is defined by a horizontal segment, a pair of vertical segments and a lower segment. The seat assembly is compressed between the first and second valve body halves. At least one reinforcing plate is disposed within a portion of the horizontal segment, such that the horizontal segment maintains its rigidity when the knife gate traverses the seat assembly.

19 Claims, 6 Drawing Sheets

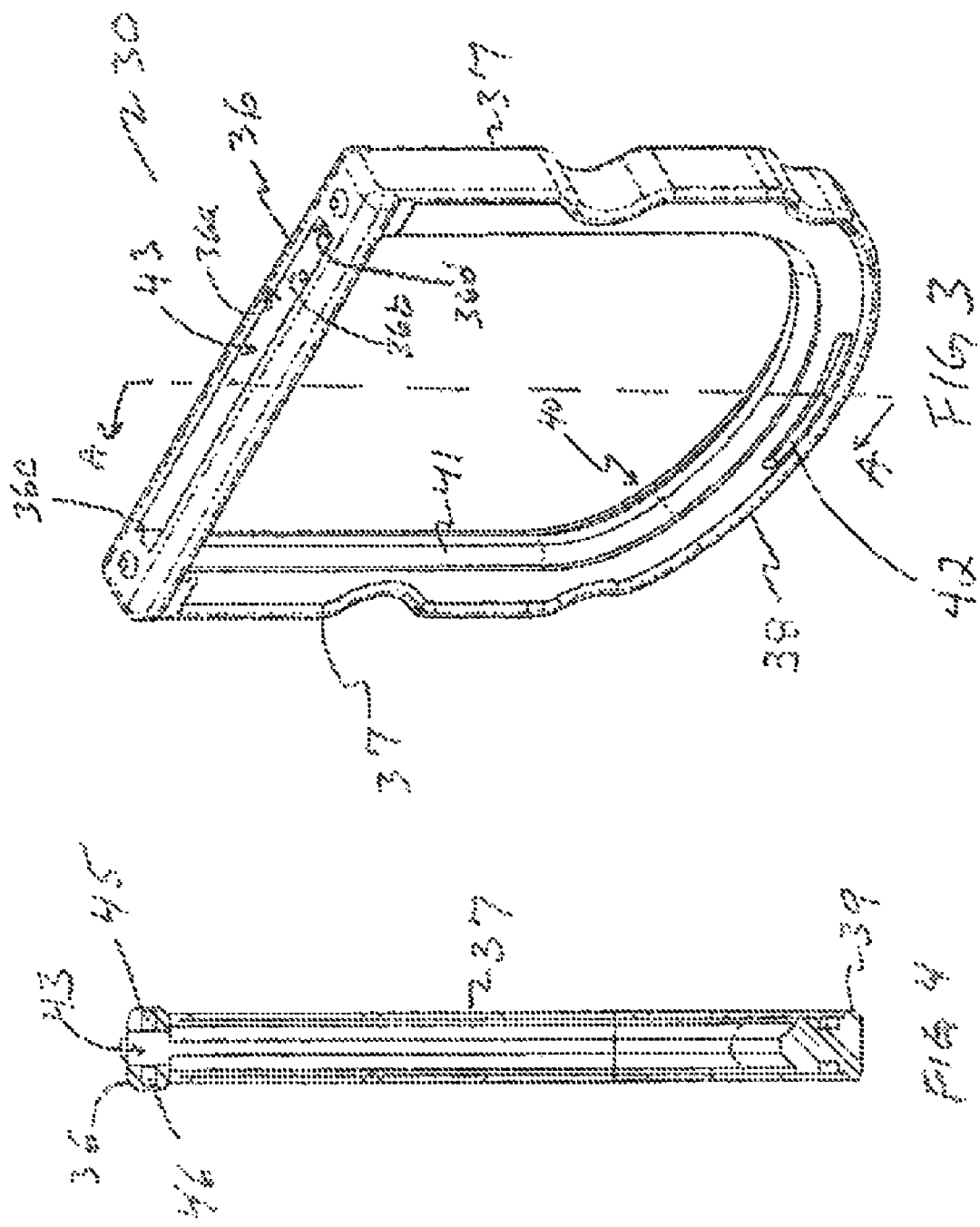

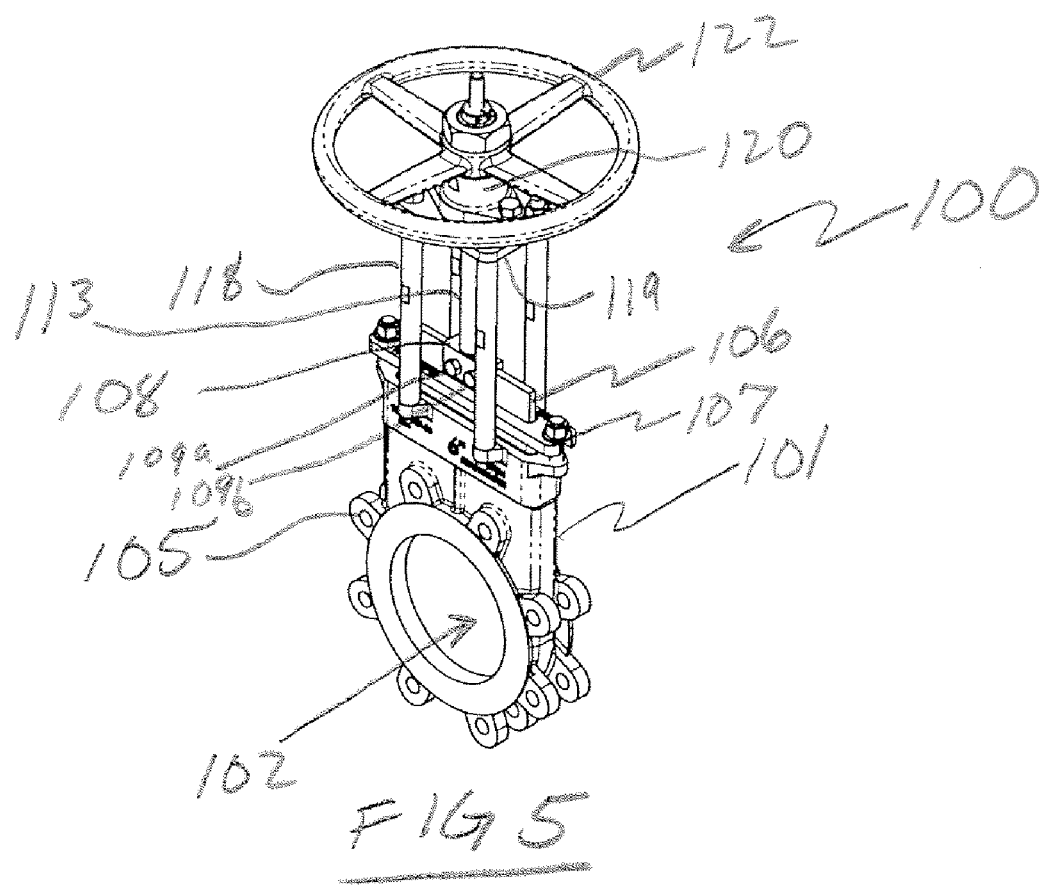

VALVE ASSEMBLY HAVING A REINFORCED VALVE SEAT

BACKGROUND OF THE INVENTION

The present invention relates generally to the field of flow control valves and the construction thereof. More specifically, the present invention relates to the internal components of valves including a reinforced elastomer seat that provides a sealing surface for the valve components.

Flow control valves such as, for example, knife gate valves or line blind valves, are used to control the flow of process media and can be particularly well suited for use with abrasive and corrosive slurries used in, for example, the mining, pulp or paper industries. One form of gate valve known in the art includes a housing constructed of two halves that when coupled together form the valve housing and passageway therethrough. On opposite sides of the housing are connections for installing the valve in a pipe line, for example, the housing can be bolted to a flange end of a pipe. To control the flow of fluid through the valve, the valve includes a knife gate that is disposed within a valve body which is comprised of two valve body halves. In operation, when the knife gate is raised, the valve is open and process media flows through the passageway. When the knife gate is lowered, the valve is closed and process media is prevented from flowing through the passageway.

Each of the valve body halves includes a recess in which is disposed a valve seat that provides a sealing function between the knife gate and the valve body. The valve seat seals against the gate when the gate is in the open configuration to allow for process media to flow through the valve while substantially preventing process leakage out of the valve housing. Previous valve seats include a top horizontal portion which is displaced within the valve body when the gate valve is lowered or raised. This movement with the recesses of the valve body causes process media to leak into the valve housing. One previous valve seat included one or more injection chambers within the horizontal portion of the valve seat. These chambers were accessible from outside the valve housing and adapted to receive injectable packing which created a seal with the knife gate. However, use of injectable packing did not provide a rigid enough valve seat to prevent displacement within the recesses of the valve body. Thus, there is a need for a knife gate valve seat configured to prevent displacement within a valve housing when the valve is opened and closed.

SUMMARY OF THE INVENTION

Preferred embodiments of the inventions are directed to a knife gate valve having a valve body defined by a first and second body halves. The valve halves are assembled to define a flow path, a knife gate channel and a seat channel. A knife gate is disposed between the body halves and adapted to traverse the gate channel. The knife gate is configured to be in an open position to allow process flow through said valve and a closed position to prevent process flow through the valve. The knife gate also includes a lower edge. A seat assembly is positioned within the channel guide and is defined by a horizontal segment, a pair of vertical segments and a lower segment corresponding to the lower edge of the knife gate. The seat assembly is compressed between the first and second valve body halves. At least one reinforcing plate is disposed within a portion of the horizontal segment, such that the horizontal segment maintains its rigidity when the knife gate traverses the seat assembly.

BRIEF DESCRIPTION OF THE DRAWINGS

FIG. 3 is a perspective view of seat assembly of the knife gate valve shown in FIG. 1.

FIG. 4 is a cross sectional view of the seat assembly shown in FIG. 3 taken along lines A-A.

FIG. 5 is a perspective view of another embodiment of a knife gate valve having a valve sleeve in accordance with the present invention.

DETAILED DESCRIPTION

Figure 1:
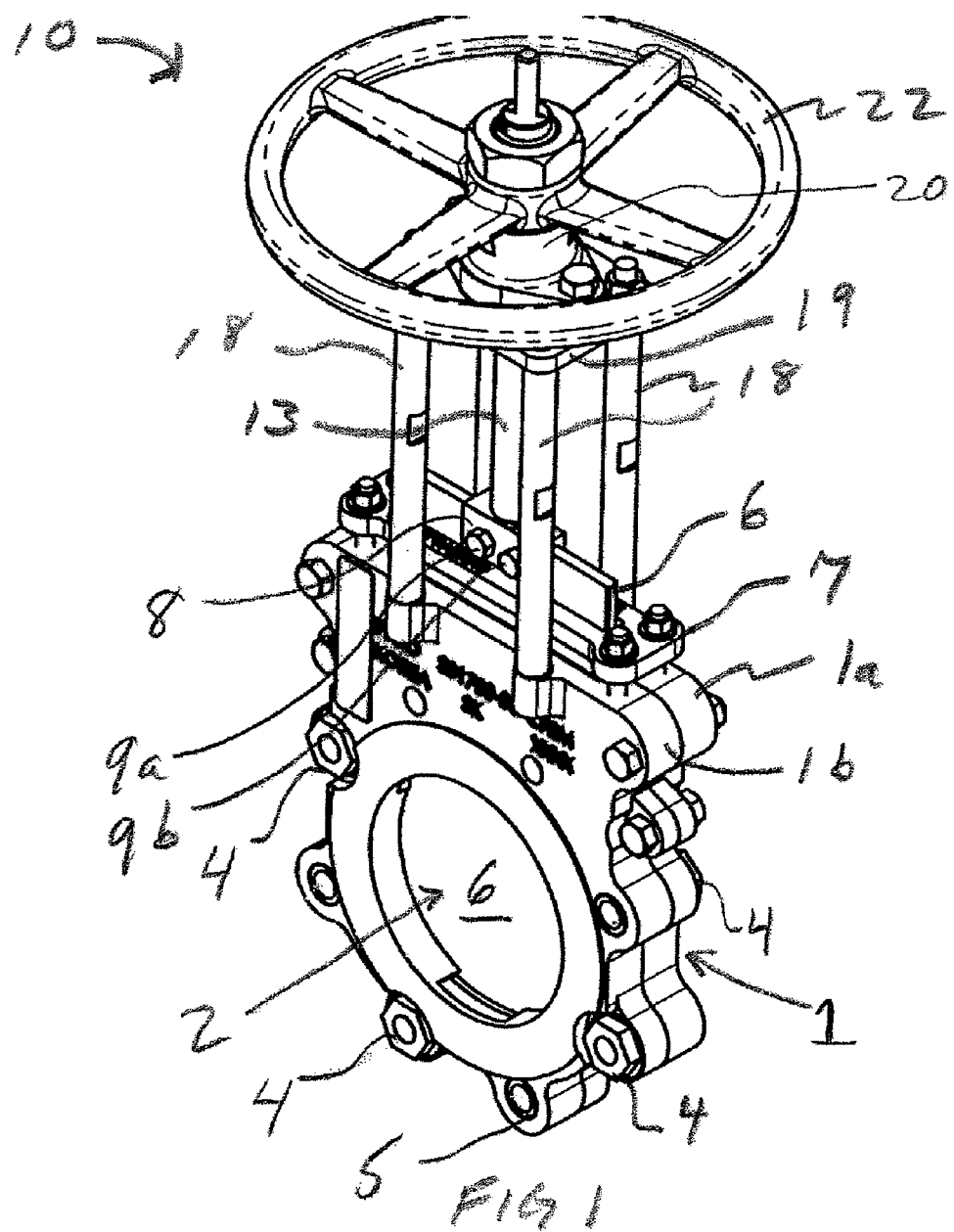
FIG. 1 is a perspective view of a knife gate valve having a valve sleeve in accordance with the present invention.

FIG. 1 is a perspective view of an embodiment of a knife gate valve for connection within a process line in accordance with the present invention. Valve 10 generally includes body halves 1a and 1b which define a valve housing 1 and a pathway or channel 2 through which process media flows. Body halves 1a and 1b form a gate channel which receives gate 6 which opens to allow process flow through valve 10 and closes to prevent process flow through valve 10. The body halves 1a and 1b are connected via a plurality of body bolts 4 received by threaded apertures 5 disposed in spaced relationship around body halves 1a and 1b. Yoke posts 18 are connected to body halves 1a and 1b at a first end and to yoke top plate 19 at a top or second end. Stem assembly 13 is connected to gate 6 via fastener block 8 which may include, for example fasteners 9a and 9b. Handwheel 22 is mounted above top plate 19 and when turned, rotates stemnut (not shown) to pull the stem linearly up and down which raises and lowers gate 6. Although valve 10 is shown with handwheel actuation, other types of actuators including, but not limited to pneumatic, hydraulic and electric may also be employed to open and close gate 6.

Figure 2:
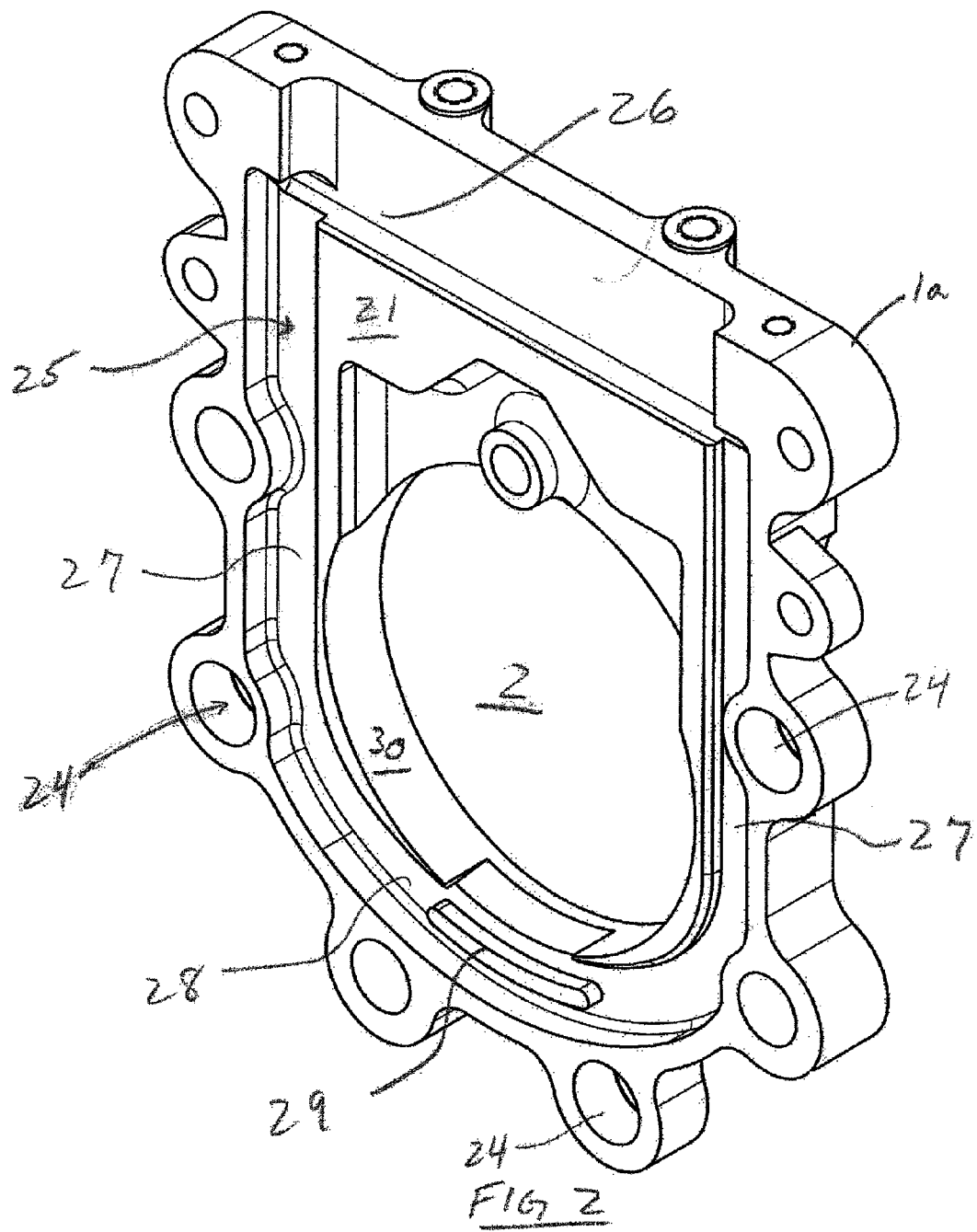
FIG. 2 illustrates a cut-away interior view of a body half of the knife gate valve shown in FIG. 1.

FIG. 2 illustrates a cut-away interior view of body half 1a having a plurality of orifices 24 adapted to receive body bolts 4. The interior surface 21 of body half 1a includes a recessed channel guide 25 which receives seat assembly 40 (shown in FIG. 3). Channel guide 25 is comprised of a substantially horizontal channel portion 26, a pair of substantially vertical channel portions 27 and a curved channel portion 28. Body half 1a further includes a flange portion 29 located within curved channel portion 28 which assists in the retention of seat assembly 40 within housing. Overhang section 30 of the interior of body half 1a forms a portion of channel guide 25 as well as sections of vertical channels 27. Overhang section 30 assists in the retention of seat assembly 40 within housing 1 as described below. Body half 1b is a mirror image of body half 1a.

FIG. 3 is a perspective view of seat assembly 30 defined by horizontal segment 36, a pair of vertical segments 37 and a curved lower segment 38. Seat assembly 30 is positioned within channel guide 25 such that a seal is formed between gate 6 and seat 30 when gate 6 is in a closed position within valve 10. Seat assembly 30 may be comprised of an elastomeric material with each of segments 36, 37 and 38 integrally formed. Conversely, seat assembly 30 is configured to allow gate 6 to move upward within housing 1 when valve 10 is in an open position. A ridge 41 is centrally disposed along the interior surface 40 of vertical segments 37 and curved lower segment 38 of seat assembly 30. This ridge 41 contacts an outer perimeter of gate 6 when valve 10 is in a closed position. Curved segment 38 includes a cavity 42 which receives flange portion 29 (shown in FIG. 2) of body half 1a. Similarly, the opposite side of curved segment 38 also includes a second cavity which receives a flange portion of body half 1b. Horizontal segment 36 includes a gate opening 43 defined by interior walls 36a, 36b, 36c and 36d through which gate 6 is positioned. Gate opening 43 has length and width dimensions corresponding to the length and width dimensions of gate 6 such that when gate 6 is in a closed position, the interior walls 36a, 36b, 36c and 36d of horizontal segment 36 form a sufficient seal with the perimeter surface of gate 6.

FIG. 4 is a cross sectional view of seat assembly 30 taken along lines A-A. Horizontal segment 36 includes a reinforcing plate 45 which is integrally formed with the elastomer material and positioned on each side of gate opening 43. Reinforcing plate 45 includes an opening or slot which is aligned with gate opening 43. Reinforcing plate 45 may be, for example, made from metal and may run the entire length of horizontal segment 36 or a portion of the length of horizontal segment 36. Reinforcing plate 45 provides rigidity to seat assembly 30 and in particular horizontal segment 36 to maintain its structure as gate 6 traverses through opening 43 when valve 10 is opened and closed. In this manner, displacement of seat assembly 30 within recessed channel guide 25 is reduced thereby alleviating possible leaks within the valve housing 1 when knife gate 6 is opened and closed. In addition, reinforcing plate 45 prevents opening 43 and associated interior walls 36a, 36b, 36c and 36d from expanding when in contact with the perimeter surface of gate 6. Returning briefly to FIG. 2, once horizontal segment 36 is positioned within horizontal channel portion 26, packing material is filled on top of segment 36 and packing gland 7 is attached to body halves 1a and 1b. Packing materials used are those well known in the art and may include, for example, various yarns such as acrylic, Teflon®, Teflon graphite, Kevlar®, etc. These materials may be braided into a square packing material, a modable material composed primarily of Teflon or a packing braided around an elastomer core.

FIG. 5 is a perspective view of another embodiment of a knife gate valve for connection within a process line in accordance with the present invention having a unitary valve body 101. In particular, valve 100 generally includes a unitary valve body 101 which defines a pathway or channel 102 through which process media flows. Unitary valve body 101 includes a gate channel that receives gate 106 which opens to allow process flow through valve 100 and closes to prevent process flow through valve 100. Unitary valve body 101 is connected to a process pipeline via a plurality of threaded apertures 105 disposed in spaced relationship around unitary body 101. Yoke posts 118 are connected to unitary body 101 at a first end and to yoke top plate 119 at a top or second end. Stem assembly 113 is connected to gate 106 via fastener block 108 which may include, for example fasteners 109a and 109b. Handwheel 122 is mounted above top plate 119 and when turned, rotates stemnut (not shown) to raise and lower gate 106. Again, although valve 100 is shown with handwheel actuation, other types of actuators including, but not limited to pneumatic, hydraulic and electric may also be employed to open and close gate 106.

Figure 6:
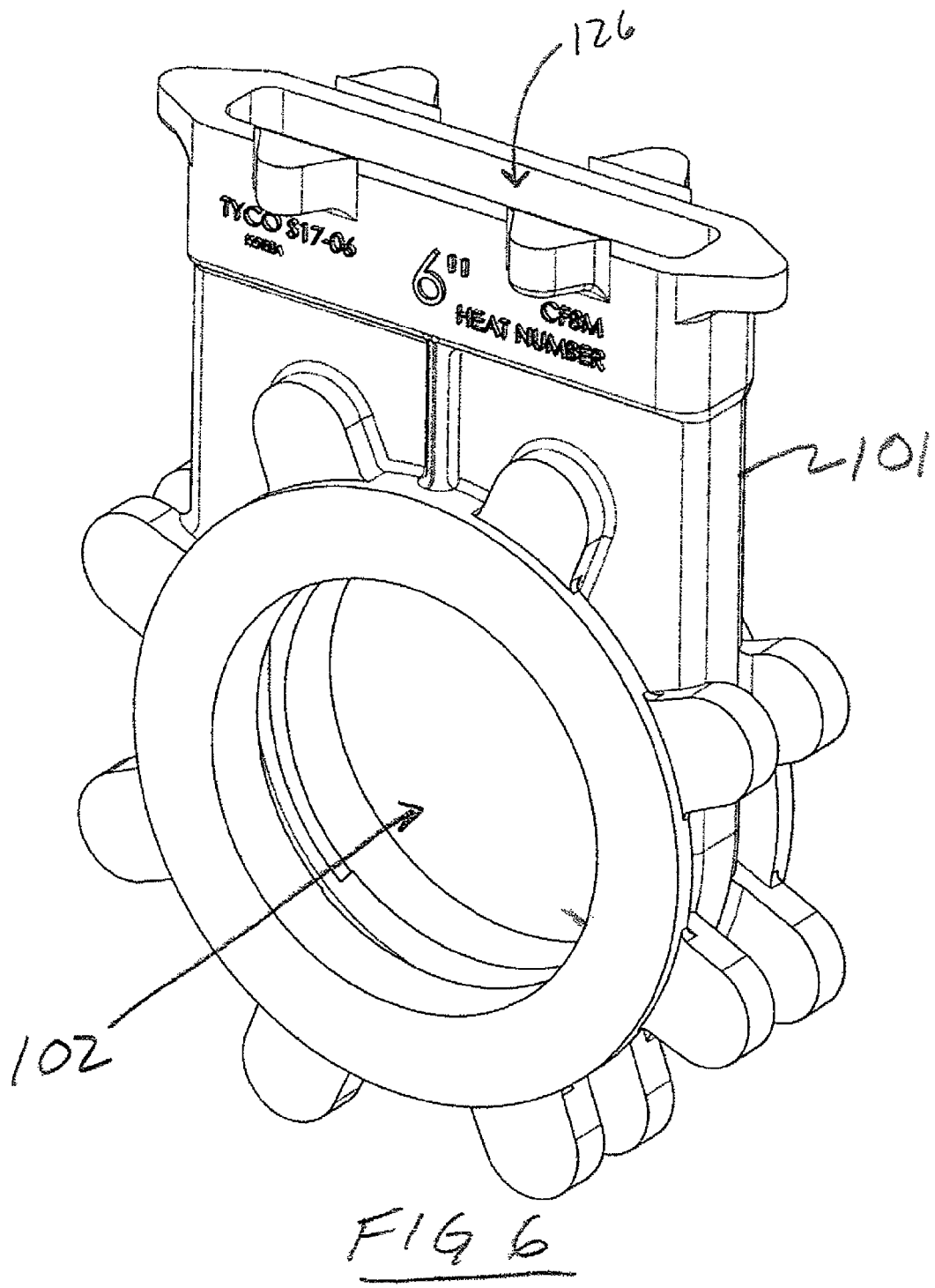
FIG. 6 is a perspective view of unitary valve body of the knife gate valve shown in FIG. 5.
Figure 7:
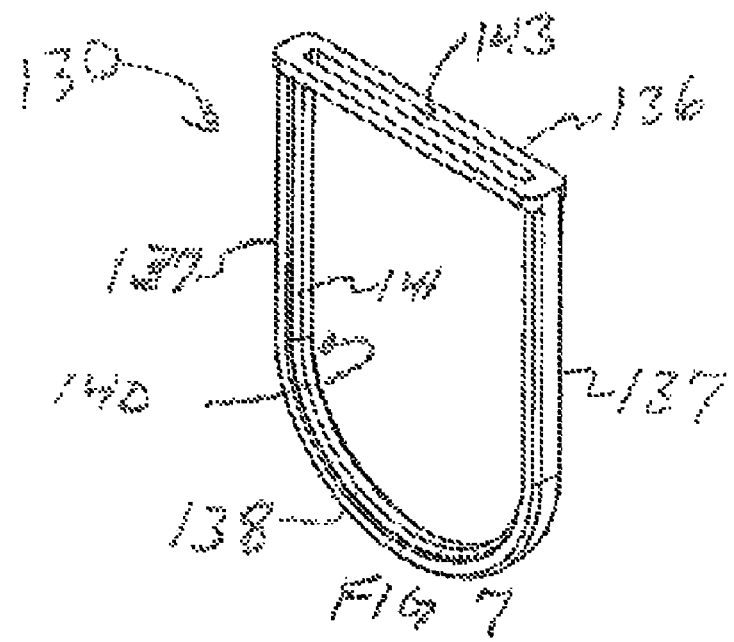
FIG. 7 is a perspective view of the seat assembly of the knife gate valve shown in FIG. 5.

FIG. 6 is a perspective view of unitary valve body 101 defining a pathway or channel 102 through which process media flows. Unitary valve body 101 includes a seat channel 126 similar to the channel formed by body halves 1a and 1b shown in FIGS. 1 and 2. Valve seat assembly 130 shown in FIG. 7 is positioned in seat channel 126 of unitary body 101 such that a seal is formed between gate 106 and seat 130 when gate 106 is in a closed position within valve 100. In particular, FIG. 7 is a perspective view of seat assembly 130 defined by horizontal segment 136, a pair of vertical segments 137 and a curved lower segment 138. Seat assembly 30 may be comprised of an elastomeric material with each of segments 136, 137 and 138 integrally formed. Gate opening 143 has length and width dimensions corresponding to the length and width dimensions of gate 106 such that when gate 106 is in a closed position, the interior walls of opening 143 of horizontal segment 36 forms a sufficient seal with the perimeter surface of gate 106. In addition, ridge 141 is centrally disposed along the interior surface 140 of vertical segments 137 and curved lower segment 138 of seat assembly 130. This ridge 141 contacts the outer perimeter of gate 106 when valve 100 is in a closed position.

Figure 8:
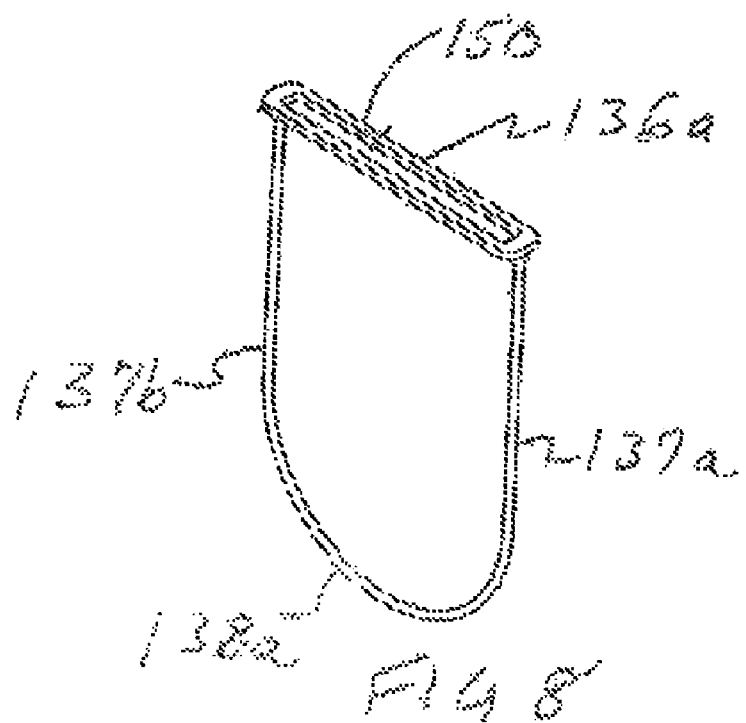
FIG. 8 illustrates reinforcing plates which are integrally formed within the seat assembly shown in FIG. 7.

Because seat assembly 130 is positioned in unitary valve body 101 rather then between 2 valve body halves, sufficient rigidity is needed to force the seat into seat channel 126. FIG. 8 illustrates reinforcing plates 136a, 137a, 137b, and 138a which are integrally formed within each of the seat assembly segments 136, 137 and 138. The reinforcing plate positioned within segment 136 includes an opening or slot 150 which is aligned with gate opening 143. Reinforcing plates 136a, 137a, 137b, and 138a may be a single piece of metal or other sufficiently rigid material to allow seat assembly 130 to maintain its structure when installed in seat channel 126 of valve body 101. The elastomer material used to form the seat assembly is then molded around the reinforcing plates 136a, 137a, 137b, and 138a. Once installed in the seat channel, packing material is placed on top of the seat assembly 130 together with a packing gland 107 (shown in FIG. 5) to retain the seat assembly within valve body 101.

While the present invention has been disclosed with reference to certain embodiments, numerous modifications, alterations and changes to the described embodiments are possible without departing from the sphere and scope of the present invention, as defined in the appended claims. Accordingly, it is intended that the present invention not be limited to the described embodiments, but that it has the full scope defined by the language of the following claims, and equivalents thereof.

What is claimed is:

1. A knife gate valve:
  a valve body defining a flow channel, a knife gate channel and a seat channel guide;
  a knife gate adapted to traverse said knife gate channel, said knife gate having a lower edge and configured to be in an open position to allow process flow through said valve and a closed position to prevent process flow through said valve;
  a seat assembly positioned within said seat channel guide, said seat assembly defined by a horizontal segment, a pair of vertical segments and a lower segment corresponding to said lower edge of said knife gate, said seat assembly compressed within said valve body; and
  a reinforcing plate disposed within a portion of said horizontal segment, such that said horizontal segment maintains its rigidity when said knife gate traverses said seat assembly.

2. The valve of claim 1 wherein said valve body comprises a first and second body halves assembled to define said flow channel, said knife gate channel and said seat channel guide, each of said first and second body halves having an overhang portion disposed around a portion of said flow path and configured to retain said seat assembly within said channel seat.

3. The valve of claim 2 wherein said first body half further includes a flange portion extending from said seat channel guide.

4. The valve of claim 3 wherein said lower segment of said seat assembly further comprises a cavity adapted to receive said flange portion of said first body half.

5. The valve of claim 2 wherein said second body half further includes a flange portion extending from said channel seat.

6. The valve of claim 5 wherein said lower segment of said seat assembly further comprises a cavity adapted to receive said flange portion of said second body half.

7. The valve of claim 2 wherein said first body half further includes a plurality of apertures in spaced relationship around said first body half and configured to receive fasteners for connection with said second body half.

8. The valve of claim 2 wherein said second body half further includes a plurality of apertures in spaced relationship around said second body half and configured to receive fasteners for connection with said second body half.

9. The valve of claim 1 further comprising a stem assembly connected at a first end to said knife gate and at a second end to an actuator such that said actuator raises and lowers said knife act.

10. The valve of claim 1 wherein said seat assembly is integrally molded from an elastomeric material.

11. The valve of claim 1 wherein said horizontal segment of said seat assembly further comprises a gate opening defined by a plurality of interior walls, said gate opening having dimensions corresponding to dimensions of said knife gate.

12. The valve of claim 1 wherein said valve body is a unitary valve body.

13. The valve of claim 12 wherein said reinforcing plate is a first reinforcing plate, said seat assembly further comprising a second reinforcing plate disposed within at least one of said pair of vertical segments and connected to said first reinforcing plate.

14. The valve of claim 13 further comprising a third reinforcing plate connected to said second reinforcing plate and formed within said lower segment of said seat assembly.

15. The valve of claim 14 further comprising a fourth reinforcing plate connected to said second and third reinforcing plate, said fourth reinforcing plate formed within said lower segment of said seat assembly.

16. The valve of claim 12 wherein said reinforcing plate is a first reinforcing plate, said knife gate valve further comprising a second reinforcing plate disposed within at least one of said pair of vertical segments and connected to said first reinforcing plate and a third reinforcing plate disposed within the other of said pair of vertical segments and connected to said first reinforcing plate.

17. The valve of claim 12 wherein said reinforcing plate is a first reinforcing plate, said seat assembly further comprising a second reinforcing plate integrally formed with said first reinforcing plate and extending down each of said pair of vertical segments and said lower segment.

18. A knife gate valve:
a valve body having a flow channel, a knife gate channel and a seat channel guide, said valve body defined by a first and second body halves assembled together, each of said first and second body halves having an overhang portion disposed around a portion of said flow path, at least one of said body halves having a flange portion extending from said seat channel guide;
a knife gate adapted to traverse said knife gate channel, said knife gate having a lower edge and configured to be in an open position to allow process flow through said valve and a closed position to prevent process flow through said valve;
a seat assembly positioned within said seat channel guide, said seat assembly defined by a horizontal segment, a pair of vertical segments and a lower segment corresponding to said lower edge of said knife gate, said lower segment including a cavity corresponding to said flange portion, said seat assembly compressed between said first and second valve body halves wherein said overhang portions are configured to retain said seat assembly within said channel seat guide and said cavity receives said flange portion of at least one of said body halves; and
a reinforcing plate disposed within a portion of said horizontal segment, such that said horizontal segment maintains its rigidity when said knife gate traverses said seat assembly.

19. The valve of claim 18 wherein said reinforcing plate is a first reinforcing plate, said seat assembly further comprising a second reinforcing plate connected to said first reinforcing plate and extending down at least one of said pair of vertical segments.

* * * * *

UNITED STATES PATENT AND TRADEMARK OFFICE
CERTIFICATE OF CORRECTION

| | | |
|---|---|---|
| PATENT NO. | : 7,815,170 B2 | Page 1 of 1 |
| APPLICATION NO. | : 11/939870 | |
| DATED | : October 19, 2010 | |
| INVENTOR(S) | : Donald L. Devine, Jr. et al. | |

It is certified that error appears in the above-identified patent and that said Letters Patent is hereby corrected as shown below:

Column 4,
Line 51, after the words "A knife gate valve" please add --comprising--

Column 6,
Line 15, after the words "A knife gate valve" please add --comprising--

Signed and Sealed this
Thirtieth Day of August, 2011

David J. Kappos
*Director of the United States Patent and Trademark Office*